(12) United States Patent
Prajapati et al.

(10) Patent No.: US 8,881,850 B2
(45) Date of Patent: Nov. 11, 2014

(54) CUTTER POCKET DESIGN

(75) Inventors: Jimykumar Prajapati, Houston, TX (US); Navish Makkar, Houston, TX (US); Michael James Rodgers, Humble, TX (US); Robert Patrick Moore, Conroe, TX (US); Dwayne P. Terracina, Spring, TX (US)

(73) Assignee: Smith International, Inc., Houston, TX (US)

( * ) Notice: Subject to any disclaimer, the term of this patent is extended or adjusted under 35 U.S.C. 154(b) by 320 days.

(21) Appl. No.: 12/767,503

(22) Filed: Apr. 26, 2010

(65) Prior Publication Data

US 2010/0276210 A1 Nov. 4, 2010

Related U.S. Application Data

(60) Provisional application No. 61/174,928, filed on May 1, 2009.

(51) Int. Cl.
*E21B 10/55* (2006.01)
*C22C 26/00* (2006.01)

(52) U.S. Cl.
CPC ................ *E21B 10/55* (2013.01); *C22C 26/00* (2013.01)
USPC ............................ 175/432; 175/431; 175/426

(58) Field of Classification Search
USPC .................................. 175/426, 430, 431, 432
See application file for complete search history.

(56) References Cited

U.S. PATENT DOCUMENTS

| | | | |
|---|---|---|---|
| 4,520,881 A * | 6/1985 | Phaal | 175/433 |
| 4,862,977 A | 9/1989 | Barr et al. | |
| 5,431,239 A * | 7/1995 | Tibbitts et al. | 175/428 |
| 6,598,689 B1 * | 7/2003 | Slaughter et al. | 175/331 |
| 8,272,458 B2 * | 9/2012 | Nackerud | 175/416 |
| 2008/0223622 A1 | 9/2008 | Duggan et al. | |
| 2008/0308321 A1 | 12/2008 | Aliko et al. | |
| 2009/0020339 A1 | 1/2009 | Sherwood, Jr. | |

OTHER PUBLICATIONS

International Search Report and Written Opinion of the International Searching Authority issued in corresponding International Patent Application No. PCT/US2010/032662; Dated Dec. 27, 2010 (7 pages).

* cited by examiner

*Primary Examiner* — William P Neuder
*Assistant Examiner* — Richard Alker
(74) *Attorney, Agent, or Firm* — Osha Liang LLP

(57) ABSTRACT

A drilling tool including a tool body and a cutter pocket formed in the tool body, the cutter pocket including a front planar surface, a back planar surface opposite the front planar surface, a first side surface between the front and back planar surfaces, and a second side surface opposite the first side surface and between the front and back planar surfaces is disclosed herein. A method of manufacturing a drilling tool including machining a tool body having a cutter pocket in accordance with embodiments disclosed herein, disposing a cutting element in the cutter pocket, and brazing the cutting element in the cutter pocket is disclosed.

7 Claims, 6 Drawing Sheets

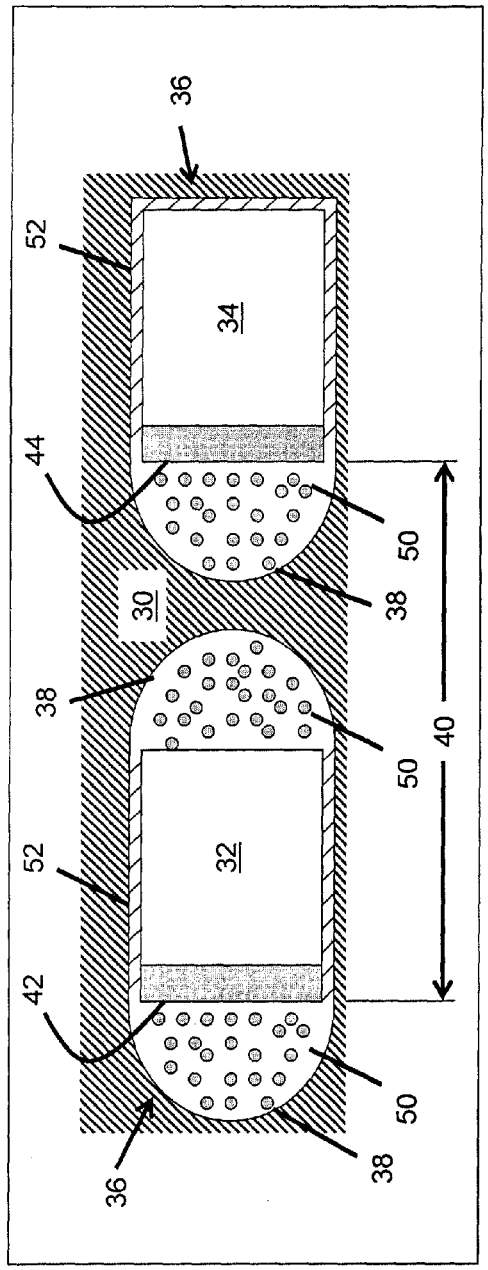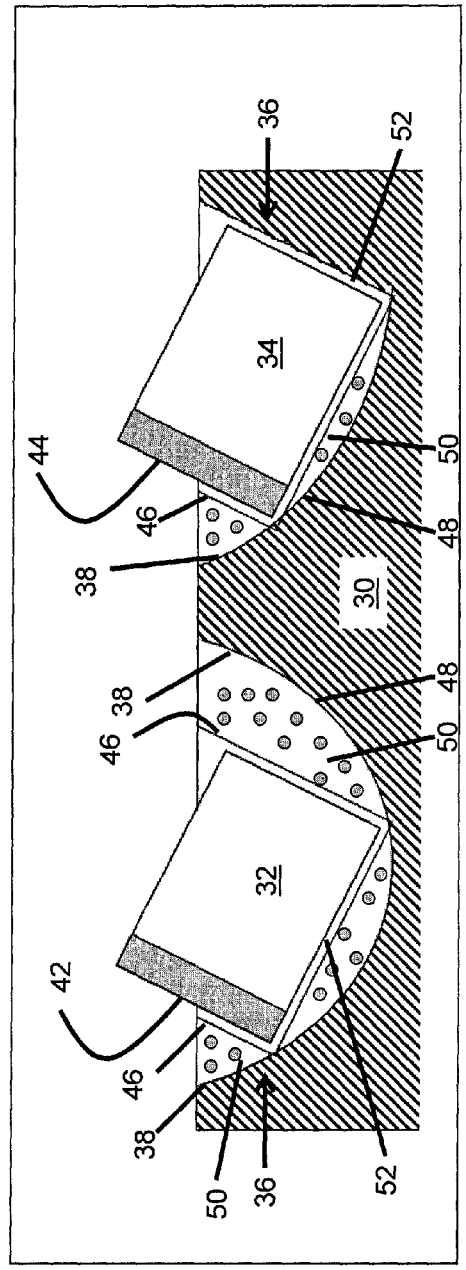

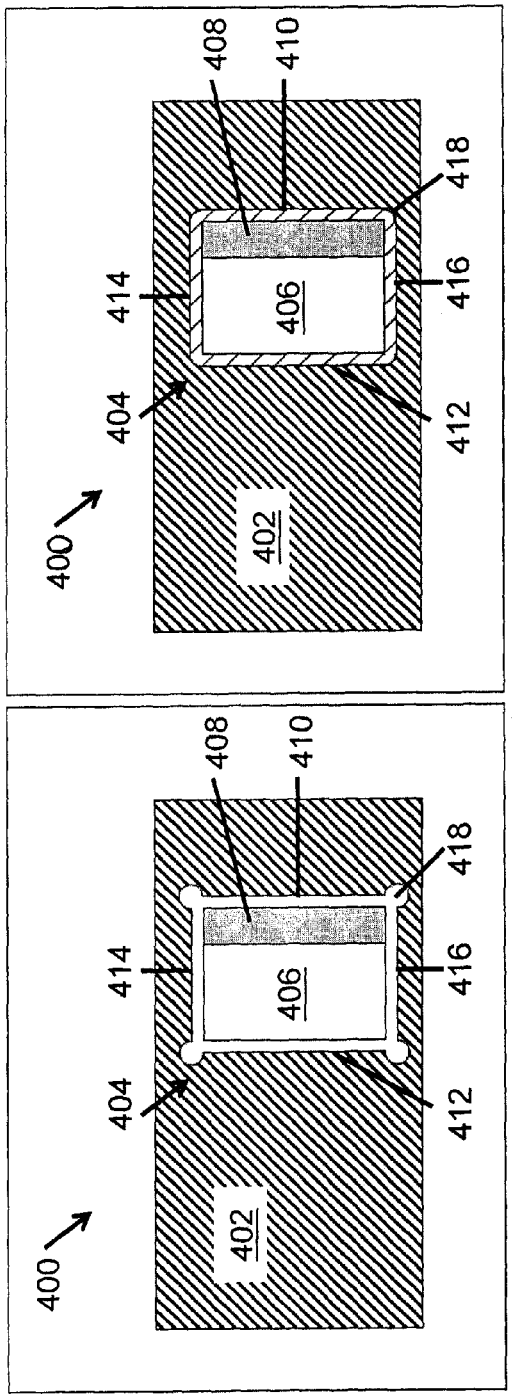
Figure 4A
Figure 4B
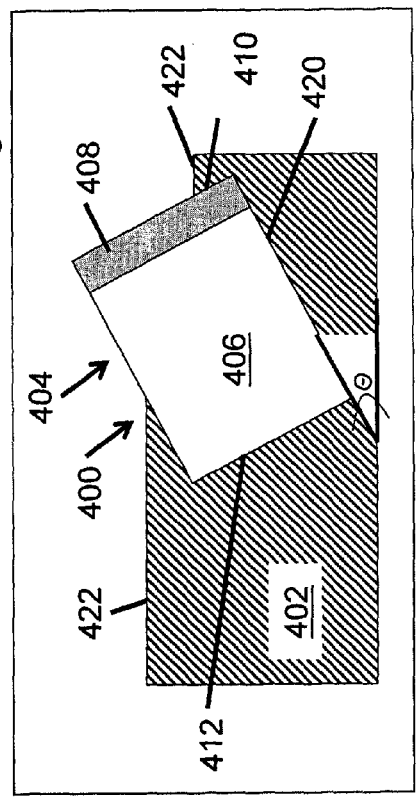
Figure 4C

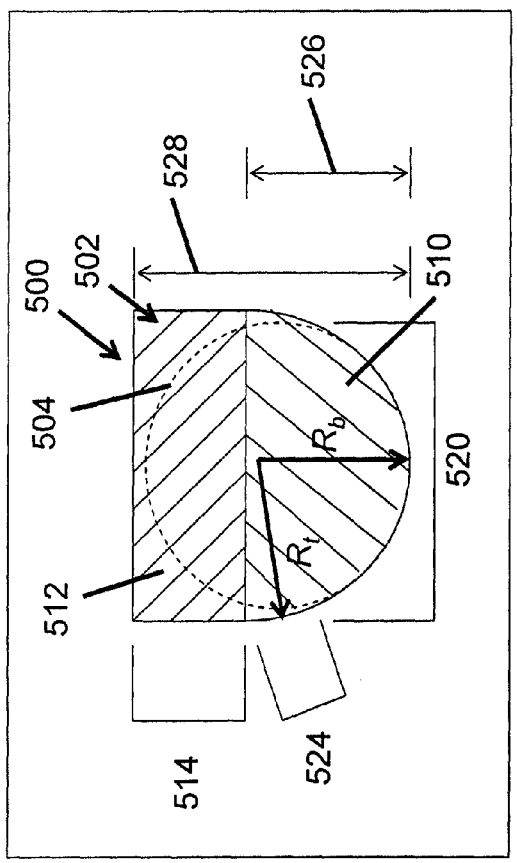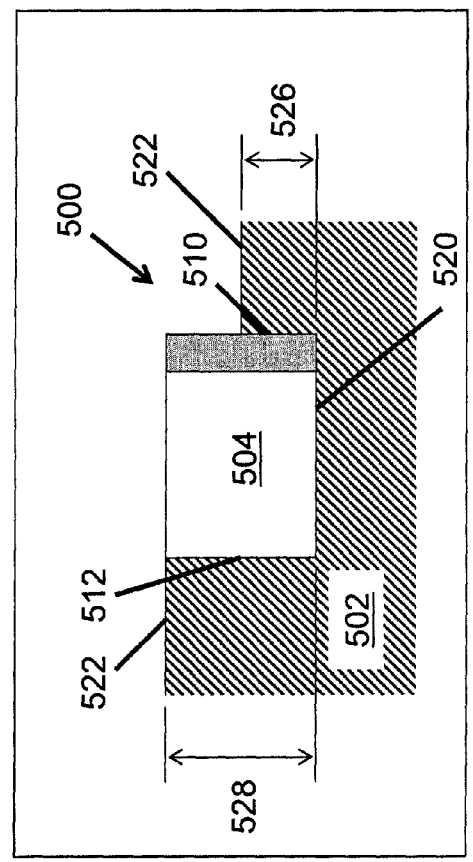
Figure 5A
Figure 5B

CUTTER POCKET DESIGN

CROSS-REFERENCE TO RELATED APPLICATIONS

This application, pursuant to 35 U.S.C. §119(e) claims priority to U.S. Provisional Application Ser. No. 61/174,928, filed May 1, 2009. That application is incorporated by reference in its entirety.

BACKGROUND OF INVENTION

1. Field of the Invention

Embodiments disclosed here generally relate to cutter pockets for use on downhole tools. More specifically, embodiments disclosed herein relate to cutter pockets for top loading cutters. More specifically still, embodiments disclosed herein relate to substantially square cutter pockets for top loading cutters.

2. Background Art

FIG. 1 shows one example of a conventional drilling system for drilling an earth formation. The drilling system includes a drilling rig 10 used to turn a drilling tool assembly 12 that extends downward into a well bore 14. The drilling tool assembly 12 includes a drilling string 16, and a bottom-hole assembly (BHA) 18, which is attached to the distal end of the drill string 16. The "distal end" of the drill string is the end furthest from the drilling rig.

The drill string 16 includes several joints of drill pipe 16a connected end to end through tool joints 16b. The drill string 16 is used to transmit drilling fluid (through its hollow core) and to transmit rotational power from the drill rig 10 to the BHA 18. In some cases the drill string 16 further includes additional components such as subs, pup joints, etc.

The BHA 18 includes at least a drill bit 20, also known as a primary cutting structure. Typical BHA's may also include additional components attached between the drill string 16 and the drill bit 20. Examples of additional BHA components include drill collars, stabilizers, measurement-while-drilling (MWD) tools, logging-while-drilling (LWD) tools, subs, hole enlargement devices also known as secondary cutting structures (e.g., hole openers and reamers), jars, accelerators, thrusters, downhole motors, and rotary steerable systems.

Referring to FIGS. 2 and 3 together, cutting tools including, for example, drill bits, hole openers, and reamers, work by engaging and removing formation. Typically, the body 30 of the cutting tool includes a plurality of cutting elements 32, 34 each having a cutting face 42, 44 that engages the formation.

Cutting elements 32, 34 are conventionally attached to cutter pockets 36 disposed in the cutting tool body 30. The cutter pockets 36 typically feature at least one scooped portion 38 to allow cutting elements 32, 34 to be loaded into the cutter pocket from the front or the back. The scoop 38 of the cutter pocket 36 increases the minimum distance 40 between the cutting faces 42, 44 of the cutting elements. As a result, the number of cutters that may be placed on a cutting tool body 30 of limited size is decreased.

Cutting elements 32, 34 may be disposed on drilling tools according to several processes. Specifically, cutting elements 32, 34 may be disposed as either top loading cutters (meaning the cutting elements are disposed in cutter pockets from the top of a tool) or front loading cutters (meaning the cutting elements are disposed in cutter pockets from the front of a tool). Top loading cutting elements may be used in various downhole tools. Examples of such tools may include fixed cutter drill bits, also known in the art as drag bits or PDC bits, milling devices, and mill-head thereof, hole opening devices, such as reamers, and other various tools knows to those of ordinary skill in the art. Similarly, front loading cutting elements may also be used in various downhole tools, such as drill bits, milling devices, and hole opening devices.

Methods used to create cutter pockets and to affix cutting elements therein include numerous steps. Typically, the cutter pocket 36 is machined into the cutting tool body 30 using electric discharge machining (EDM) or laser machining. Next, the cutting tool body 30 is pre-heated in preparation for welding. The welding process is performed to create at least one shoulder 46 in the cutter pocket 36 on which the cutting element 32 abuts. After the welding is complete, the cutting tool body and the welded shoulders 46 are allowed to cool, which may require up to 30 hours. During the cooling process, stresses may be introduced at the interface 48 of the cutting tool body 30 and the weld metal 50 due to the difference in material properties. In some instances, the stresses may initiate cracks at the interface 48 of the cutting tool body 30 and the weld metal 50.

After the weld 50 and the cutting tool body 30 cool to a desired temperature, the weld metal 50 is cleaned of welding residue using a grinding process performed manually. This process may also be used to shape the weld shoulder 46 and to remove any irregular surfaces. The imprecise nature of the manual shaping process may prevent manufacturers from achieving the tolerances indicated in the original cutter pocket design.

Next, cutting elements 32, 34 are inserted into cutter pockets 36 so as to abut the weld shoulders 46. The cutting elements 32, 34 are typically fixed to the cutter pockets 36 using a brazing process. The bond created by the braze disposed between the weld metal 50 and the cutting elements 32, 34, typically weaker than the bond created by braze between the tool body 30 and the cutting element 32, 34. Additionally, during brazing, localized heating occurs which, consequently, requires cooling to take place. The cooling occurs at the interface between the braze metal 52 and the weld metal 50, and occurs at the interface between the braze metal 52 and the tool body 30. Due to differences in material properties, variable alignment, and dealignment of different material grains, cracks may initiate at the interfaces between the braze metal 52, the weld metal 50, and tool body 30.

Accordingly, there exists a need for a cutter pocket geometry that allows for a decreased distance between cutting elements, as well as methods of manufacturing downhole tools including such cutter pocket geometry.

SUMMARY OF INVENTION

In one aspect, the embodiments disclosed herein relate to a drilling tool including a tool body and a cutter pocket formed in the tool body, the cutter pocket including a front planar surface, a back planar surface opposite the front planar surface, a first side surface between the front and back planar surfaces, and a second side surface opposite the first side surface and between the front and back planar surfaces.

In another aspect, the embodiments disclosed herein relate to a method of manufacturing a drilling tool, the method including machining a tool body, the tool body having a cutter pocket, and the cutter pocket including a front planar surface, a back planar surface opposite the front planar surface, a first side surface between the front and back planar surfaces, and a second side surface opposite the first side surface and between the front and back planar surfaces. The method further includes disposing a cutting element in the cutter pocket and brazing the cutting element in the cutter pocket.

Other aspects and advantages of the invention will be apparent from the following description and the appended claims.

BRIEF DESCRIPTION OF DRAWINGS

FIG. 2 shows a plan view of conventional cutter pockets with cutting elements.

FIG. 3 shows a cross-sectional view of conventional cutter pockets with cutting elements.

FIGS. 4A and 4B show plan and perspective views, respectively, of a cutter pocket with a cutting element in accordance with embodiments disclosed herein.

FIG. 4C shows a cross-sectional view of view of a cutter pocket according to embodiments of the present disclosure.

FIGS. 5A and 5B and show a front perspective and a cross-sectional view, respectively, of a cutter pocket with a cutting element in accordance with embodiments disclosed herein.

DETAILED DESCRIPTION

In one aspect, embodiments disclosed herein relate to a drilling tool including a tool body and a cutter pocket formed in the tool body. More specifically, embodiments disclosed herein include cutter pockets having a front planar surface, a back planar surface opposite the front planar surface, a first side surface between the front and back planar surfaces, and a second side surface opposite the first side surface and between the front and back planar surfaces. Additionally, embodiments disclosed herein relate to cutter pockets for top loading cutters. More specifically still, embodiments disclosed herein relate to substantially square cutter pockets for top loading cutters.

Figure 1:
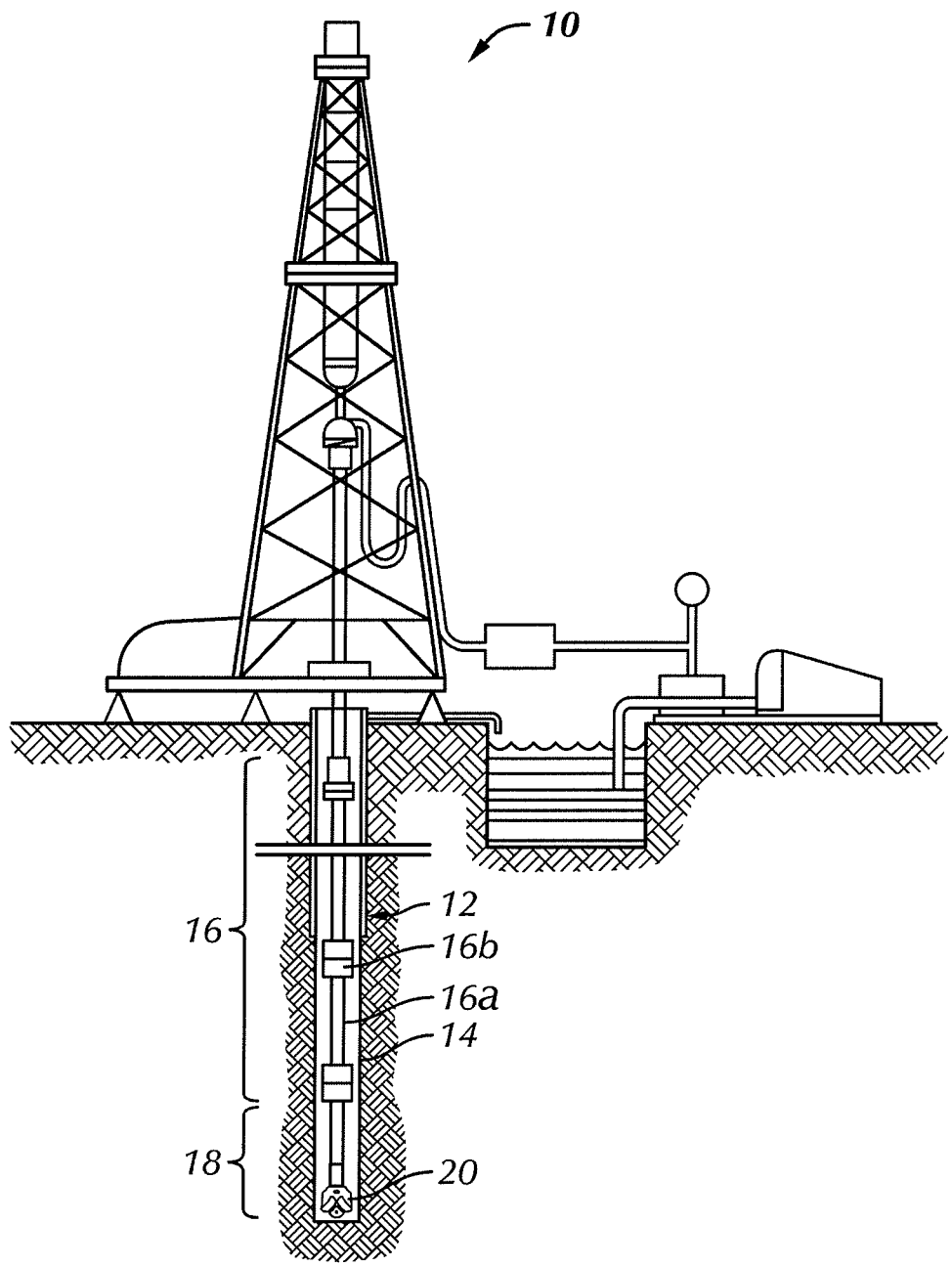
FIG. 1 is a schematic representation of a drilling operation.
Figure 4D:
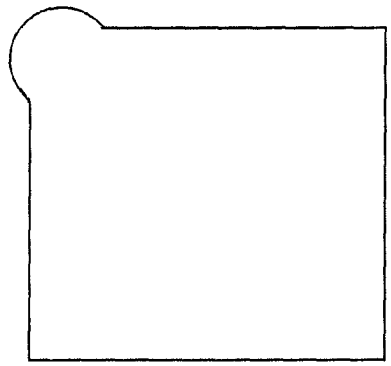
FIGS. 4D-4G shows alternate views of a cutter pocket according to embodiments of the present disclosure.
Figure 4E:
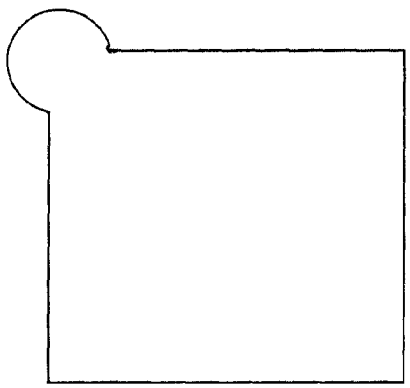
Figure 4F:
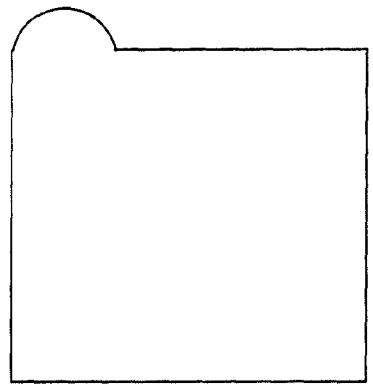
Figure 4G:
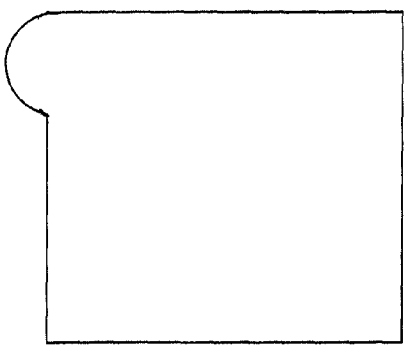

Referring to FIGS. 4A and 4B, a cutter pocket 400 disposed in drilling tool 402 is shown having a cutting element 404 disposed therein. Drilling tool 402 may include a drill bit, a secondary cutting structure, and/or a milling device. The cutting element 404 includes a substrate 406 and an ultrahard layer 408, such as a polycrystalline diamond (PCD) or polycrystalline cubic boron nitride (PCBN) layer. FIG. 4A shows the cutter pocket 400 in plan view, as seen from a viewing angle perpendicular to the surface of the drilling tool 402. The cutter pocket 400 includes a front planar surface 410 opposite a back planar surface 412. A first side surface 414 is disposed between front planar surface 410 and back planar surface 412. A second side surface 416 is disposed opposite first side surface 414 and is disposed between front planar surface 410 and back planar surface 412. In plan view, front planar surface 410, back planar surface 412, and first and second side surfaces 414, 416 may form a substantially rectangular shaped cutter pocket 400.

Referring to FIGS. 2, 4A, and 4B together, the substantially rectangular shape formed by front planar surface 410, back planar surface 412, and first and second side surfaces 414, 416 does not include a front or back scooped portion used in conventional cutter pockets. The elimination of the scooped portion may allow for the distance between cutting elements to be reduced. Typically, with scooped portions 38 included in conventional cutter pockets 36, cutting elements 32, 34 are placed no closer than 5/8 of an inch apart. Using cutter pockets in accordance with embodiments disclosed herein, a cutting element may be placed within one thousandth of an inch of another cutting element.

In select embodiments, first and second side surfaces 414, 416 may be planar or curved. Additionally, first and second side surfaces 414, 416 may intersect front planar surface 410 and back planar surface 412 at a substantially perpendicular angle. In certain embodiments, an arcuate portion 418 may be disposed at the intersection(s) of the front planar surface 410 and either or both of the side surfaces 414, 416. Additionally, an arcuate portion 418 may be disposed at the intersection(s) of the back planar surface 412 and either or both of side surfaces 414, 416. In other embodiments, the intersection(s) of planar surface 410 and either or both of side surfaces 414, 416 may be formed as a arcuate portion 418 formed at a tangent to either side surfaces 414, 416 and/or back planar surface 412 and/or front surface 410. Those of ordinary skill in the art will appreciate that in certain embodiments, other portions 418 may be formed, such as those illustrated in FIGS. 4D-4G.

Referring now specifically to FIGS. 4B and 4C, a perspective view of cutter pocket 400 disposed in drilling tool 402 and having cutting element 404 disposed therein are shown. A bottom surface 420 of cutter pocket 400 is disposed between front planar surface 410 and back planar surface 412. Bottom surface 420 of cutter pocket 400, 401 may have a bottom surface angle θ relative to a surface 422 of drilling tool 402. In certain embodiments, bottom surface angle θ may be around 30 degrees or less. In select embodiments, front planar surface 410 may be substantially parallel to back planar surface 412, as shown. Additionally, bottom surface 420 may intersect front planar surface 410 and back planar surface 412 at a substantially perpendicular angle, as shown. Those of ordinary skill in the art will appreciate that the bottom surface angle may be substantially the same as a back rake angle. Additionally, those of ordinary skill in the art will appreciate that a particular side rake may be achieved by forming cutter pocket 400 at a particular angle.

Referring to FIGS. 5A and 5B, a front view and a cross-sectional view, respectively, of a cutter pocket 500 disposed in drilling tool 502 are shown. Drilling tool 502 may include a drill bit, a secondary cutting structure, and/or a milling device. In the embodiment shown in FIGS. 5A and 5B, a cutting element 504 is disposed in cutter pocket 500 having a bottom surface 520 substantially parallel to a surface 522 of drilling tool 502. As shown in FIG. 5A, bottom surface 520 may be curved to accommodate a cylindrical cutting element. In certain embodiments, bottom surface 520 may have a substantially constant bottom radius, $R_b$, as shown. A transition zone 524 may be located between bottom surface 520 and at least one of side surfaces 514. Transition zone 524 may have a substantially constant transition radius $R_t$. In select embodiments, bottom radius $R_b$ may be substantially the same as transition radius $R_t$ such that a smooth interface between bottom surface 520 and at least one side surface 514 is obtained. One of ordinary skill in the art will appreciate that any of bottom surface 520 and side surfaces 514 may be planar. In certain embodiments, transition zone 524 may include a planar surface or a radiused surface. In alternate embodiments, there may be no transition zone 524.

Referring to FIG. 5B, front planar surface 510 is shown having a front planar surface height 526. Front planar surface height 526 refers to the length of front planar surface 510 between tool surface 522 and bottom surface 520. Back planar surface 512 having a back planar surface height 528 is also shown. Back planar surface height 528 refers to the length of back planar surface 512 between tool surface 522 and bottom surface 520. Back planar surface height 528 may be substantially the same as a diameter D of cutting element 504. In other embodiments, the back planar surface height 528 may be greater than the diameter D of cutting element 504. In certain embodiments, front planar surface height 526 is smaller than back planar surface height 528. For example, in certain embodiments front planar surface height 526 may be 25%, 50% and/or 75% smaller than back planar surface height 528.

Figure 6:
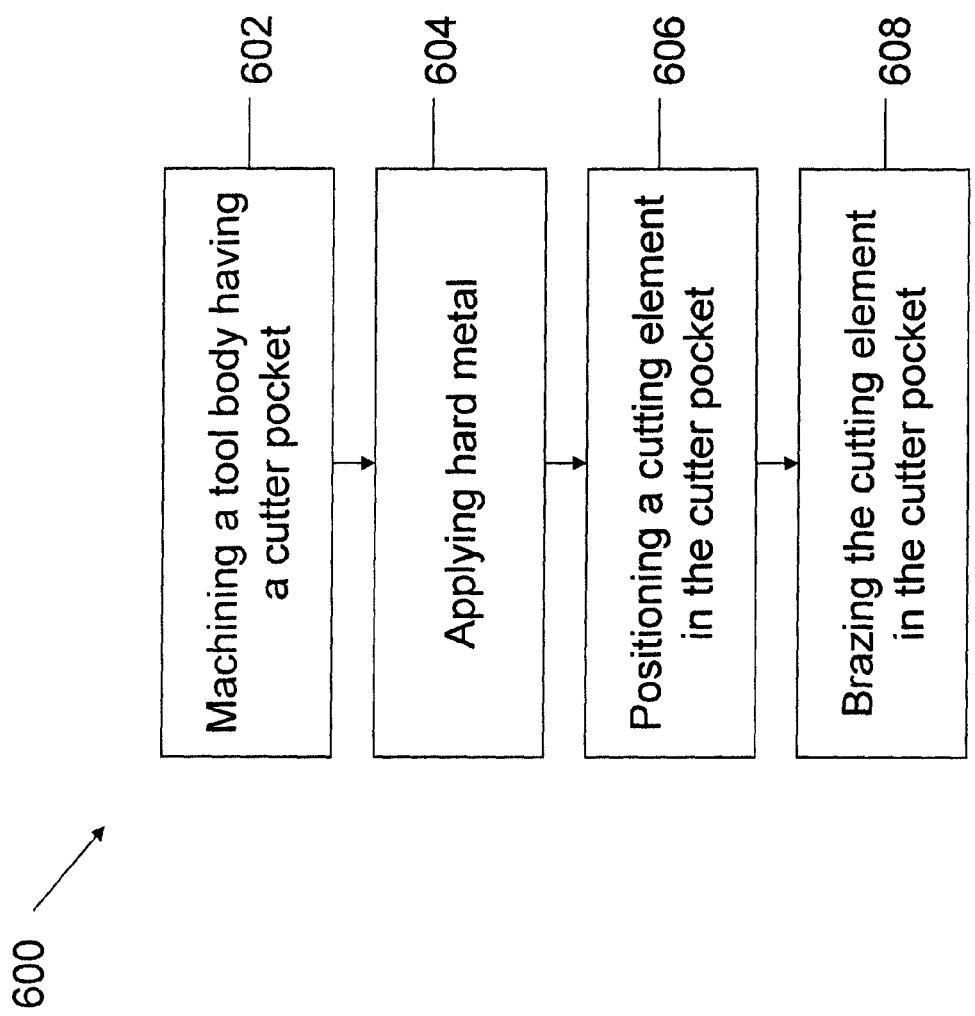
FIG. 6 shows a flow diagram of a manufacturing process in accordance with embodiments disclosed herein.

Referring now to FIG. 6, a flow diagram including method steps for a manufacturing process 600 of a drilling tool in accordance with embodiments disclosed herein is shown. Manufacturing process 600 may include machining 602 a tool body having a cutter pocket. The cutter pocket may include, for example, a front planar surface, a back planar surface opposite the front planar surface, a first side surface between the front and back planar surfaces, and a second side surface opposite the first side surface and between the front and back planar surfaces. The front planar surface, back planar surface, and first and second side surfaces may form a substantially rectangular shaped cutter pocket, when viewed from an angle perpendicular to the surface of the drilling tool, as discussed with respect to FIG. 4A.

In select embodiments, machining 602 a tool body having a cutter pocket may be performed using a five-axis mill. Machining using a five-axis mill may provide for more efficient machining with less time being spent creating the cutter pocket. Additional design parameters may be modified, for example, back rake angle, side rake angle, and cutter exposure. For example, the back rake angle may be less than approximately 30 degrees. In certain embodiments, the back rake angle may be less than approximately 15 degrees. Examples of such design parameters and rages applicable thereto may be found in, for example, U.S. Provisional Application No. 61/174,854 and U.S. application Ser. No. 12/179,469 both assigned to the assignee of the present disclosure and hereby incorporated by reference in its entirety.

The step of applying hard metal 604 to the tool body may also be included in manufacturing process 600 and may protect against wear and prevent cutting element failure. The drilling tool may require pre-heating before the hard metal is applied. After the hard metal is applied, the drilling tool may be required to cool to a desired temperature. The process of applying hard metal, including pre-heating and cooling, may take approximately 30 hours.

Manufacturing process 600 may further include disposing a cutting element in the cutter pocket 606 and brazing the cutting element in the cutter pocket 608. During the brazing step 608, a braze metal is applied between the cutter pocket and the cutting element. The braze bond is strongest when the braze metal is disposed between the cutting element and the portion of the cutter pocket made of the drilling tool body material. The braze bond is weaker when the braze metal is disposed between the cutting element and the welded shoulders. A cutter pocket designed in accordance with embodiments disclosed herein may eliminate the need for welded shoulders, as brazing may be applied between the cutting element and drilling tool body material, and advantageously, the strength of the braze bond may be maximized.

In certain embodiments, the drilling tool body may be formed out of a steel material and the cutting element may include tungsten carbide material. Brazing a cutting element into a cutter pocket formed in the drilling tool body may create a bond between the steel of the tool body and the tungsten carbide of the cutting element.

Advantageously, embodiments disclosed herein may provide for decreased manufacturing time, increased fatigue strength of a drilling tool, decreased strain on metallurgical properties of a drilling tool, cutter pockets having an improved surface finish, and cutter pockets having close tolerances. Also advantageously, the use of cutter pockets described herein may provide for drilling tools with a greater number of cutters, thereby providing for higher rates of penetration, more even distribution of stresses, etc., during drilling.

The substantially rectangular shape may also provide advantages in the manufacturing process. Specifically, the rectangular shape disclosed herein removes the scooped portion from the front and the back of a conventional cutter pocket. As a result, the step of filling the scoop with weld metal to create shoulders for the cutting element may be eliminated. The welding process performed with conventional cutter pockets produces welded shoulders for the cutting element that, once cooled, require fine shaping adjustments and weld residue removal. The fine shaping and residue removal must be done manually by grinding and finishing the weld metal, making designed tolerances difficult to achieve and increasing manufacturing time. Additionally, undesired stresses are often introduced between the weld metal and the tool body during the weld cooling process.

Advantageously, using a cutter pocket in accordance with embodiments disclosed herein may allow for processes related to the welding step, including pre-heating the tool body before welding, cooling the tool body after welding, and manually shaping the weld shoulders, to be eliminated. Eliminating the pre-heating and cooling steps associated with welding may provide increased fatigue strength of the drilling tool. Additionally, eliminating the pre-heating, welding, cooling, and shaping steps may decrease the time required to manufacture the drilling tool by approximately one day. Further, eliminating the weld residue removal and weld shaping step may allow for tighter cutter pocket tolerances. In some embodiments, a cutter pocket having a tolerance of ±0.002 inches may be achieved.

Also advantageously, cutter pockets and methods of forming cutter pockets in accordance with embodiments of the present disclosure may also allow for cutters to be top loaded into drilling tools. Such methods may also allow design parameters of top loading cutters to be varied. For example, cutter pockets formed according to methods disclosed herein may include back rake angles of less than 15 degrees, thereby providing drilling tool assemblies with a more aggressive cutting structure than conventional top loading cutters could obtain. The more aggressive cutting structure may thereby increase rate of penetration, balance forces, and decrease lateral vibrations that may damage primary and/or secondary cutting structures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A drilling tool comprising:
   a tool body; and
   a cutter pocket formed in the tool body, the cutter pocket having:
      a front planar surface;
      a back planar surface opposite the front planar surface;
      a first side surface between the front and back planar surfaces;

a second side surface opposite the first side surface and between the front and back planar surfaces, wherein at least a portion of at least one of the first side surface and second side surface is substantially planar;

a bottom surface disposed between the front planar surface and the back planar surface, wherein at least a portion of the bottom surface is substantially planar;

wherein at least one of the first side surface and second side surface is substantially perpendicular to the bottom surface; and a cylindrical cutting element brazed in the cutter pocket.

2. The drilling tool of claim 1, wherein the bottom surface intersects the front planar surface and the back planar surface at about a 90 degree angle.

3. The drilling tool of claim 1, wherein a height of the back planar surface is substantially equal to a diameter of the cutting element.

4. The drilling tool of claim 1, wherein a height of the back planar surface is greater than a diameter of the cutting element.

5. The drilling tool of claim 1, wherein a height of the back planar surface is greater than a height of the front planar surface.

6. A drilling tool comprising:

a tool body; and a cutter pocket formed in the tool body, the cutter pocket having a substantially rectangular shape formed by a front planar surface, a back planar surface opposite the front planar surface, and first and second side surfaces between the front and back planar surfaces, the cutter pocket also having a bottom surface disposed between the front planar surface and the back planar surface, wherein at least a portion of the bottom surface is substantially planar; and a cutting element brazed in the cutter pocket, an axis of the cutting element being a line running perpendicular to a face of the cutting element, the axis being substantially parallel to the bottom surface, and wherein a bottom edge of a cutting face of the cutting element contacts the bottom surface of the cutter pocket.

7. The drilling tool of claim 6, wherein the bottom surface intersects the front planar surface and the back planar surface at about a 90 degree angle.

* * * * *